US010694420B1

(12) United States Patent
Wang

(10) Patent No.: US 10,694,420 B1
(45) Date of Patent: Jun. 23, 2020

(54) TRAFFIC DEPRIORITIZATION BY USING DYNAMICALLY INDICATED INVALID SUBFRAMES

(71) Applicant: T-Mobile USA, Inc., Bellevue, WA (US)

(72) Inventor: Jun Wang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/206,889

(22) Filed: Nov. 30, 2018

(51) Int. Cl.
*H04W 28/02* (2009.01)
*H04W 48/06* (2009.01)
*H04W 72/12* (2009.01)
*H04W 72/04* (2009.01)
*H04W 4/70* (2018.01)

(52) U.S. Cl.
CPC ... *H04W 28/0268* (2013.01); *H04W 28/0236* (2013.01); *H04W 28/0252* (2013.01); *H04W 48/06* (2013.01); *H04W 72/0446* (2013.01); *H04W 72/1242* (2013.01); *H04W 4/70* (2018.02)

(58) Field of Classification Search
None
See application file for complete search history.

(56) References Cited

U.S. PATENT DOCUMENTS

| 9,681,442 | B2 * | 6/2017 | Merlin | H04W 72/0446 |
| 2009/0116439 | A1 | 5/2009 | Madan et al. | |
| 2012/0231829 | A1 * | 9/2012 | Guo | H04W 16/22 455/509 |
| 2016/0135143 | A1 * | 5/2016 | Won | H04W 72/005 370/312 |
| 2016/0337101 | A1 * | 11/2016 | Gao | H04L 5/0082 |
| 2018/0098224 | A1 * | 4/2018 | Sun | H04W 16/14 |
| 2018/0184344 | A1 * | 6/2018 | Periyasamy | H04W 24/02 |
| 2018/0184443 | A1 | 6/2018 | Li et al. | |

FOREIGN PATENT DOCUMENTS

WO 2017192082 A1 11/2017

OTHER PUBLICATIONS

European Patent Application No. 19207985.3, Extended European Search Report dated Mar. 10, 2020, 9 pages.

* cited by examiner

*Primary Examiner* — Xavier S Wong
(74) *Attorney, Agent, or Firm* — Han Santos, PLLC

(57) ABSTRACT

A base station receives a set of network information of a cellular network that relates to wireless traffic handled by the base station, A first class of the wireless traffic and a second class of the wireless traffic share a particular frequency division to access the cellular network by using different time divisions of the particular frequency division. The base station identifies a first set of time divisions of the particular frequency division based on the received set of network information. The base station disallows the first class of the wireless traffic from using the first set of time divisions to access the cellular network. The base station allows the second class of the wireless traffic to use time divisions of the particular frequency division that are not used by the first class of wireless traffic to access the cellular network.

17 Claims, 5 Drawing Sheets

US 10,694,420 B1

TRAFFIC DEPRIORITIZATION BY USING DYNAMICALLY INDICATED INVALID SUBFRAMES

BACKGROUND

Long Term Evolution (LTE) is a standard for high-speed wireless communications for mobile devices and data terminals developed by the Third Generation Partnership Project (3GPP). Wideband LTE is an enhanced version of regular LTE that is made possible by combining multiple bands of spectrum. LTE-M is a version of LTE developed for the low power wide area (LPWA) technology standard.

LTE-M networks co-exist with 4G mobile networks and benefit from the security and privacy features provided by the network infrastructures of such mobile networks, such as support for user identity confidentiality, entity authentication, confidentiality, data integrity, and mobile equipment identification. LTE-M supports Internet of Things (IoT) applications through lower device complexity and provides extended coverage, while allowing the reuse of the already installed LTE network infrastructure. IoT applications are typically delay tolerant. In comparison, Wideband LTE is designed to carry different types of data traffic, including delay sensitive traffic such as voice data traffic (e.g., Voice over LTE or VoLTE).

The spectrum of Wideband LTE is divided into physical resource blocks (PRBs). A PRB is an allocation of subcarriers or frequency divisions for a predetermined amount of time. Each PRB is further divided along the time domain into time-divisions or subframes. Six PRBs of Wideband LTE are allocated to LTE-M, but an LTE base station may indicate to an LTE-M user device which subframes are not available for LTE-M communications. During subframes that are indicated as being not available to LTE-M traffic, LTE-M transmission and reception are skipped. The subframes marked as unavailable for LTE-M traffic may then be used for other purposes, such as conducting Wideband LTE communications.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

When there are PRB subframes (or time divisions of a frequency division) that are not used for LTE-M traffic, the unused subframes can be used to schedule traffic for Wideband LTE. However, when there is too much LTE-M traffic, there may be too few subframes left unused, making such PRBs unavailable to Wideband LTE traffic. This is the case even when the LTE-M traffic is delay-tolerant and the Wideband LTE traffic is delay-sensitive (e.g., VoLTE).

This disclosure is directed to techniques for prioritizing between a first class of wireless traffic and a second class of wireless traffic, the first class of wireless traffic includes delay-tolerant traffic, and the second class of wireless traffic includes delay-sensitive traffic. A base station of a cellular network allows the first class of wireless traffic and the second class of wireless traffic to share a particular frequency division (or PRB) to access the cellular network by using different time divisions (or subframes) of the particular frequency division. The base station receives a set of network information of the cellular network that relates to the wireless traffic that the base station handles for user devices that are wirelessly connected to the base station. Based on the received network information, the base station identifies a first set of time divisions of the particular frequency division. The base station disallows the first class of wireless traffic from using the first set of time divisions to access the cellular network. The base station allows the second class of wireless traffic to use time divisions of the particular frequency division that are not used by the first class of wireless traffic to access the cellular network.

The technique of using network information to prioritize between delay-sensitive traffic and delay-tolerant traffic allows better utilization of wireless spectrum. In a cellular system in which frequency divisions (e.g., PRBs) that can be used for delay-sensitive traffic (e.g., Wideband LTE) are allocated to delay-tolerant traffic (e.g., LTE-M), the technique uses network information to dynamically deprioritize the delay-tolerant traffic in favor of delay-sensitive traffic by disallowing the delay-tolerant from using certain time divisions. Example implementations are provided below with reference to the following figures.

Figure 1:
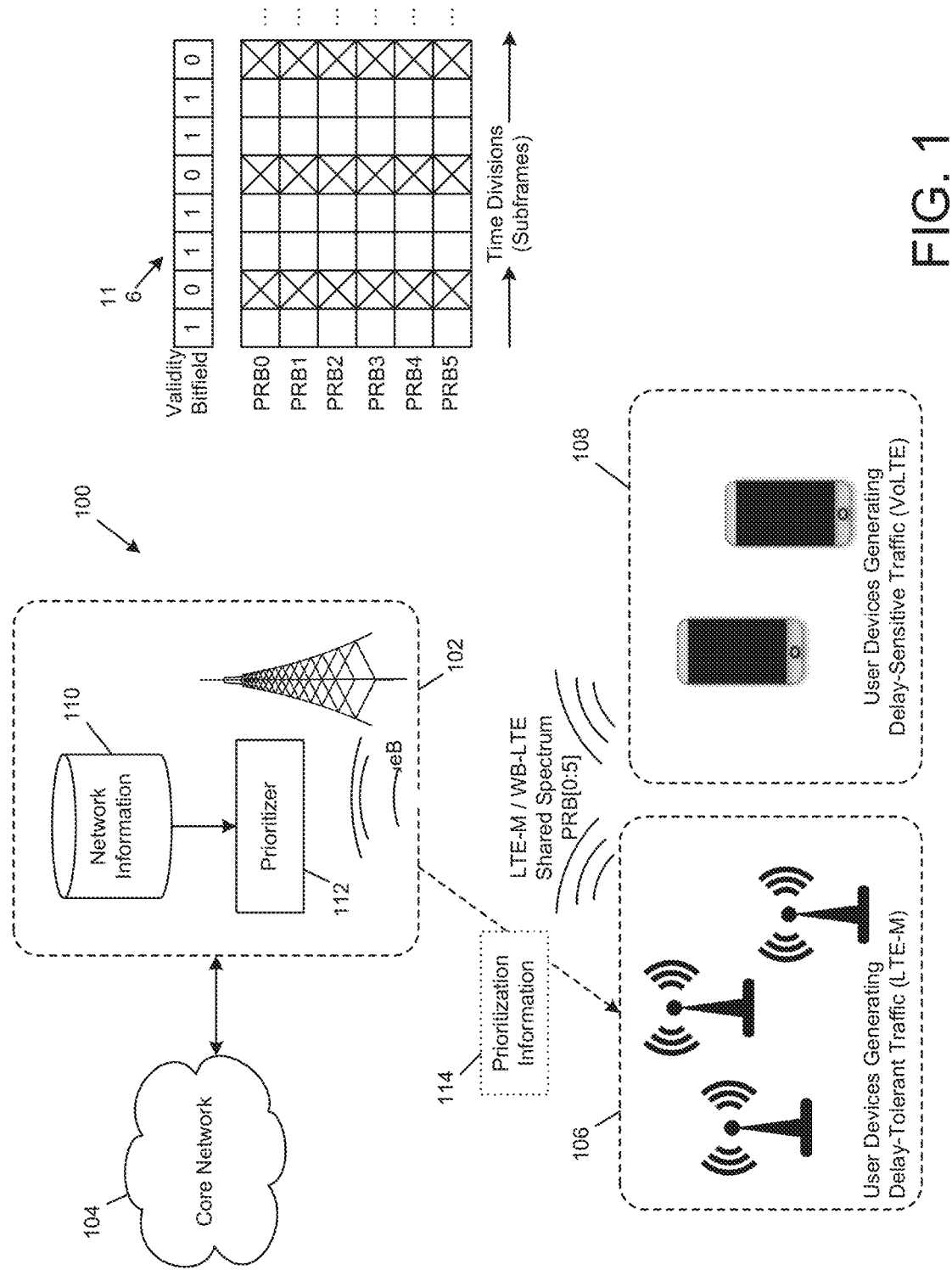
FIG. 1 conceptually illustrates a cellular network in which a base station that prioritizes between delay-tolerant traffic and delay-sensitive traffic based on network information that relates to wireless traffic handled by the base station.

FIG. 1 conceptually illustrates a cellular network 100 in which a base station 102 prioritizes between delay-tolerant traffic and delay-sensitive traffic based on network information that relates wireless traffic handled by the base station. As illustrated, the base station 102 is one of the base stations of the cellular network 100 that allows user devices to wirelessly access a core network 104 of the cellular network 100. The user devices wirelessly accessing the cellular network 100 include user devices 106 that communicate via delay-tolerant traffic and user devices 108 that communicate via delay-sensitive traffic. The base station 102 receives various types of network information 110 from the core network 104. The base station 102 may also measure the traffic flow from the user devices 106 and 108 and use the measurement result as network information 110. A prioritizer 112 in the base station 102 uses the received network information 110 to prioritize between delay-tolerant traffic and delay-sensitive traffic.

The base station 102 is a wireless network cell that allows wireless access to the core network 104 of the cellular network 100. The base station 102 may be an Evolved Node B (eNodeB) of an LTE/4G network. For example, the base station 102 may be a macrocell, a femtocell, a picocell, or some other network cell. The base station 102 supports LTE-M and allows IoT user devices to connect with an LTE/4G network. The base station 102 also includes computing and storage devices that can be used to process the network information 110 for prioritizing between delay-tolerant traffic and delay-sensitive traffic. The base station 102 also includes communications hardware for communicating with user devices 106 and 108.

The core network 104 includes routers, switches, or other types of data forwarding elements for conducting data traffic (e.g., packet traffic) between various network endpoints such as user devices, base stations, hotspots, and other types of computing resources. The core network 104 also provides access to external networks such as the Internet. The core network 104 may include components that provide services to the subscribers of the cellular network 100 and track positions of the user devices. The core network 104 may include a packet network, e.g., an Evolved Packet Core (EPC) that interconnects different components belonging to an Evolved Packet System (EPS). EPC is a framework for providing converged voice and data on a 4G LTE network. EPC unifies voice and data on an Internet Protocol (IP) service architecture. The EPC allows the operator of the cellular network 100 to deploy and operate one packet network for 2G, 3G, 4G, 5G, wireless local area network (WLAN), and fixed access such as Ethernet, DSL, cable, and fiber.

The user devices 106 and 108 are computing devices that are capable of communicating with other devices via the cellular network 100. The user devices 106 generate delay-tolerant traffic, such as LTE-M traffic for IoT applications. The user devices 106 may include a utility meter, a sensor, an alarm monitor, a smart watch, or a device whose intended function does not significantly degrade or fail even if there is significant delay in communications with the base station 102. The user devices 108 generate delay-sensitive traffic, such as VoLTE traffic for voice applications. The user devices 108 may include a smart phone, a multimedia streaming device, a location tracker device, or a device whose intended function degrades or fails if there is significant delay in communications with the base station 102.

In some instances, the user devices 106 and 108 may use low-energy consumption modems or transceivers that support lower data communications rates to communicate with the cellular network 100 as LTE-M devices. Some user devices may run both delay-tolerant applications and delay-sensitive applications and therefore generate both types of traffic (e.g., both LTE-M and VoLTE).

The network information 110 includes static and dynamic information about the cellular network 100 that relates to the wireless traffic handled by the base station 102. Such information may include instrumentation data, measurements, statistics collected by the base station 102 from the cellular network 100 and from the user devices 106 and 108, and other network information that affects wireless traffic handled by the base station 102. Examples of the information may include service level agreement, network statistics, time, date, and historical traffic data. The network statistics may include the number of bits or packets transmitted across the various parts of the Wideband LTE spectrum (e.g., different PRBs), information regarding applications currently running in user devices 106 and 108, etc. The base station 102 may use the network information to determine one or more utilization metrics for the wireless spectrum, such as a utilization metric for various PRBs, including the six PRBs assigned to LTE-M.

As mentioned, the part of the spectrum assigned to LTE-M traffic (such as the six PRBs) may also be used by Wideband LTE traffic, including VoLTE traffic. A base station may deprioritize LTE-M traffic by designating some of the subframes of the six PRBs as invalid for LTE-M traffic. In some embodiments, the base station may designate some subframes of the six PRBs as being invalid for LTE-M traffic in order to guarantee that a certain lower bound number of subframes be available to Wideband LTE traffic. The base station may use network information such as the PRB utilization metric to determine how many subframes to designate as being unavailable to LTE-M traffic.

For example, when network information indicates low PRB utilization, the base station may designate few or no subframes as invalid for LTE-M. When the network information indicates high PRB utilization, the base station 102 may designate more subframes as invalid for LTE-M so that LTE wideband traffic can use the invalidated subframes. In some embodiments, the base station 102 dynamically adjust the number of invalidated subframes based on the PRB utilization metric.

In the example of FIG. 1, the availability of subframes for LTE-M traffic is illustrated as rows of boxes. Each row represents a PRB, and each box of a row corresponds to a subframe of a PRB. A box that is filled with an "x" corresponds to a subframe that is designated as being unavailable to LTE-M traffic but available for Wideband LTE traffic. A box that is illustrated as blank correspond to a subframe that is available to LTE-M traffic. Such a subframe can be used by user devices to transport Wideband LTE traffic if it is not in use for LTE-M traffic.

In some embodiments, the base station 102 communicates the designation of subframes to the user devices 106 in a prioritization information 114. The prioritization information 114 indicates the designation of unavailable subframes as a bitfield 116, where each bit position in the bitfield corresponds to a PRB subframe. As illustrated, the validity bitfield 116 is transmitted to the user devices 106. The user devices 106 running delay-tolerant LTE-M applications use the bitfield 116 to identify subframes that are invalid for LTE-M traffic. In the example bitfield 116, a '0' at a bit position in the bitfield indicates a corresponding subframe that is invalid or unavailable to LTE-M traffic, while a '1' indicates a corresponding subframe that is valid or available for LTE-M traffic.

In some embodiments, the base station 102 uses bitfields specified by 3GPP to indicate to user devices the availability of subframes for LTE-M traffic. For example, 3GPP bitfield fdd-DownlinkOrTddSubframeBitmapBR can be used to indicate which subframes are/are not available for LTE-M downlink communications, while 3GPP bitfield fdd-UplinkSubframeBitmapBR can be used to indicate which subframes are/are not available for LTE-M uplink communications. The base station 102 transmits or broadcast these bitfields as part of the prioritization information 114 to the user devices 106. A user device receiving the bitfield uses each bit in the bitfield to determine whether it is allowed to use a corresponding subframe to transmit or receive LTE-M traffic, and whether the user device is allowed to use the subframe to transmit or receive Wideband LTE traffic.

Figure 2:
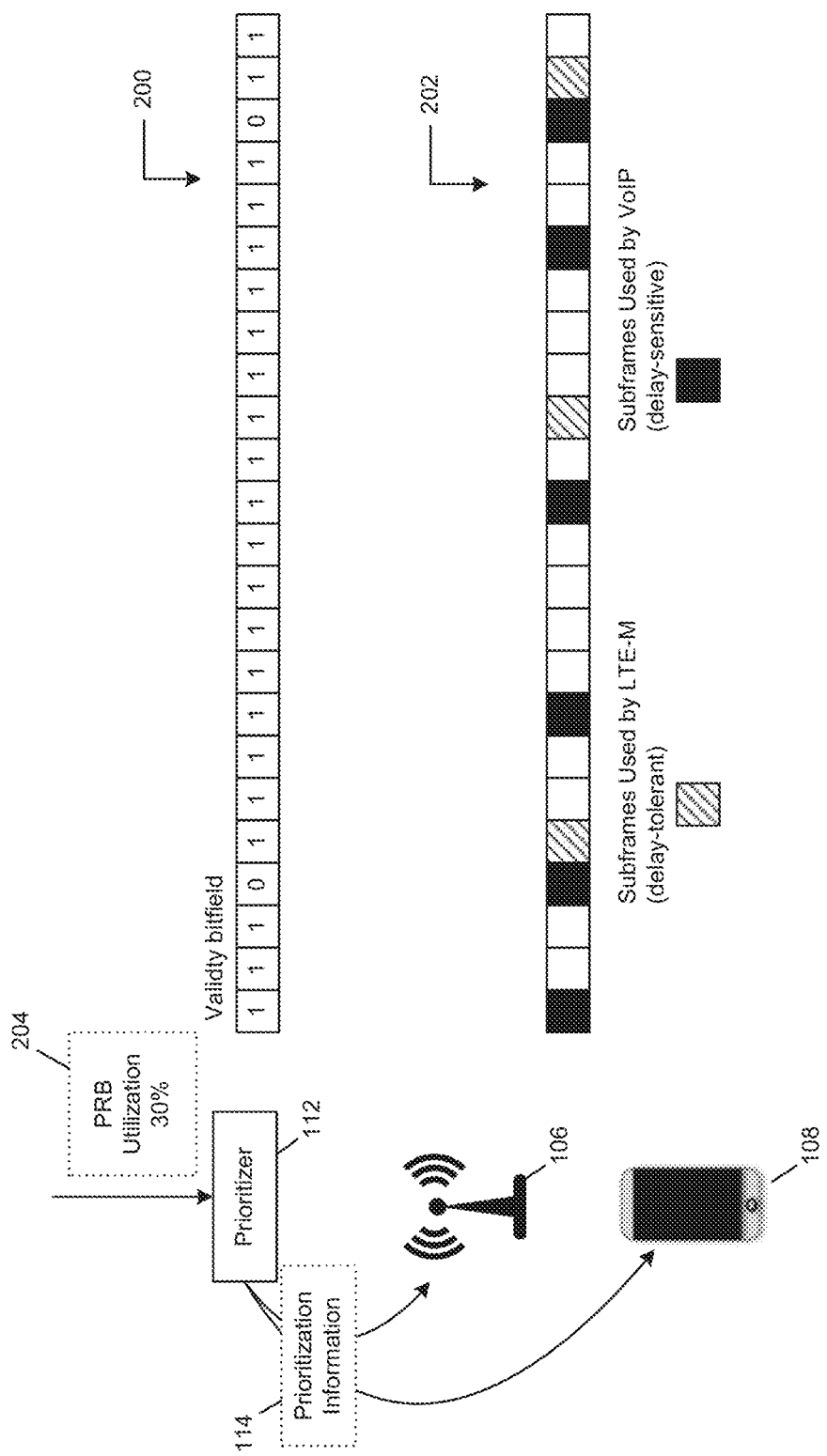
FIG. 2 illustrates a validity bitfield when network information indicates low PRB utilization.

FIG. 2 illustrates using a validity bitfield 200 to prioritize between delay-sensitive traffic and delay-tolerant traffic when network information indicates low PRB utilization. The bitfield 200 is part of the prioritization information 114 generated by the base station 102. The figure shows the content of the validity bitfield 200, as well as the corresponding use of the subframes by the user devices 106 for LTE-M traffic and by user devices 108 for Wideband LTE traffic. The use of the subframes is conceptually illustrated by a time division usage chart 202 that shows the subframe usage by LTE-M traffic and by Wideband LTE traffic.

As illustrated, the prioritizer 112 of the base station 102 generates the validity bitfield 200 based on PRB utilization statistics 204. The PRB utilization statistics 204 is part of the network information 110 received by the base station 102. As mentioned, network information such as PRB utilization is used to determine how many subframes to designate as invalid to LTE-M traffic. In some embodiments, when there is low utilization of the PRBs, few, if any subframes are designated as being unavailable to LTE-M. This is because during low PRB utilization, there is enough PRBs for delay-sensitive Wideband LTE traffic, and more subframes can be used by delay tolerant LTE-M traffic.

In the example of FIG. 2, the PRB utilization statistics 204 indicates that the PRB utilization rate is at 30%. Since the PRB utilization is fairly low, the time division usage chart 202 shows more subframes can be used by LTE-M as indicated by "1" in Validity bitfield 200. The base station 102 therefore does not deprioritize LTE-M traffic, and the user devices 106 are free to transport delay-tolerant LTE-M traffic. Correspondingly, the prioritizer 112 generates the validity bitfield 200 to have few 0's to leave most subframes valid for LTE-M traffic.

Figure 3:
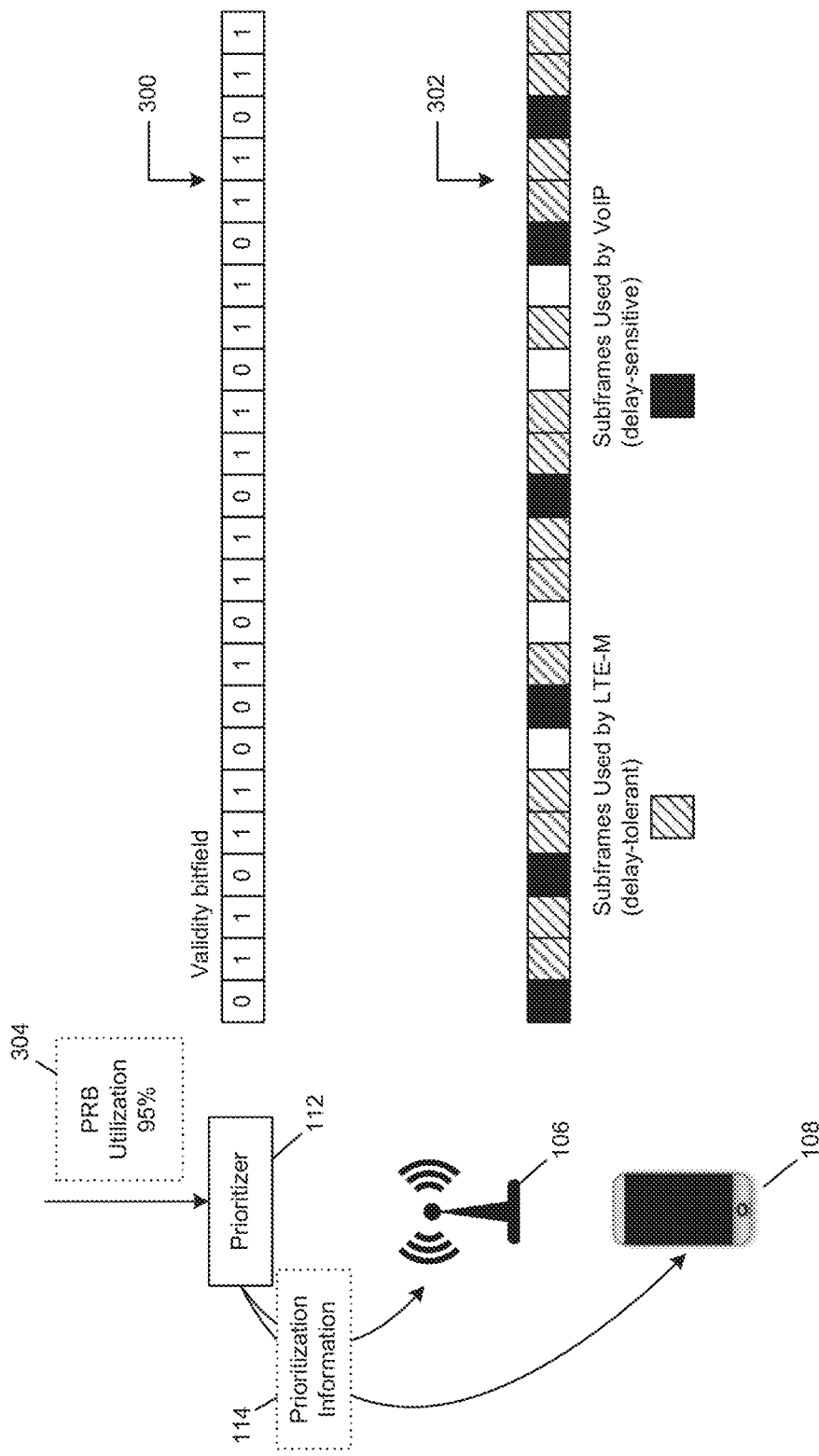
FIG. 3 illustrates a validity bitfield when network information indicates high PRB utilization.

FIG. 3 illustrates a validity bitfield 300 when network information indicates high PRB utilization. The validity bitfield 300 is part of the prioritization information 114 generated by the base station 102 according to PRB utilization statistics 304, which is part of the network information 110. The figure shows the content of the validity bitfield 300, as well as the use of the subframes by the user devices 106 for LTE-M traffic and by user devices 108 for Wideband LTE traffic based on the validity bitfield 300. The use of the subframes is conceptually illustrated by a time division usage chart 302 that shows the subframe usage by LTE-M traffic and by Wideband LTE traffic.

In the example of FIG. 3, the PRB utilization statistics 304 indicates that the PRB utilization is at 95%, indicating much wideband LTE traffic is waiting to use the PRBs. In order to prevent the LTE-M traffic from using too many subframes such that too few PRBs remain available for delay-sensitive Wideband LTE traffic, the base station 102 deprioritizes LTE-M traffic by designating less subframes as being available for LTE-M traffic. This guarantees at least a minimum number of subframes remain available to transport delay-sensitive Wideband LTE traffic. In some embodiments, the number of subframes marked as unavailable for LTE-M traffic is proportional to PRB utilization and guarantees a minimum number of subframes for delay-sensitive traffic.

As illustrated in validity bitfield 300, nearly a third of the bits in the bitfield 300 are marked with 0's such that nearly a third of the subframes are designated as being invalid for LTE-M traffic. The time division usage chart 302 shows that the invalidated subframes are used by Wideband LTE traffic to maintain at least a lower bound rate for delay-sensitive VoLTE traffic. In other words, when PRB utilization is high, the base station deprioritizes delay-tolerant LTE-M traffic in favor of delay-sensitive Wideband LTE traffic.

Example Base Station

Figure 4:
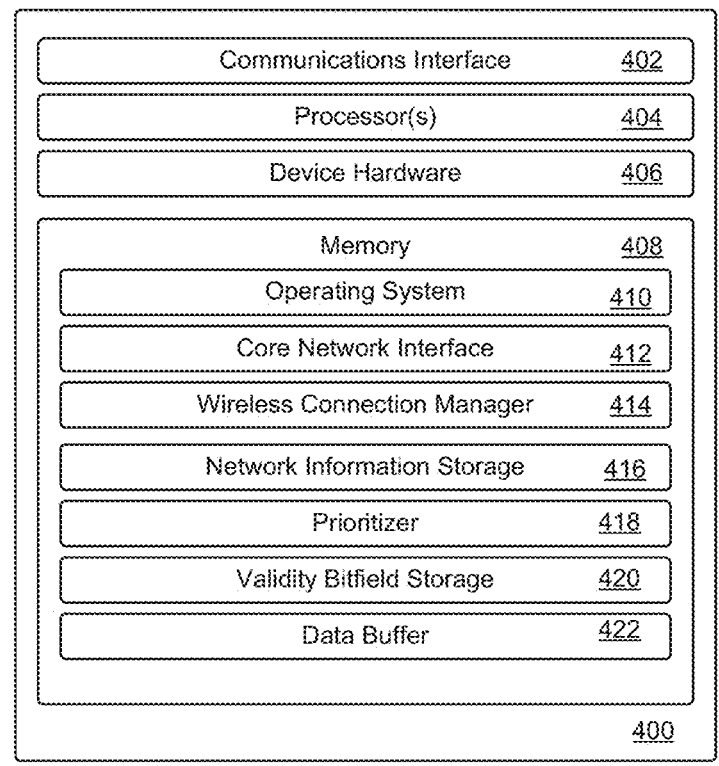
FIG. 4 is a block diagram showing various components of an example computing device implementing a base station that prioritizes between delay-tolerant traffic and delay-sensitive traffic based on network information.
Figure 4:
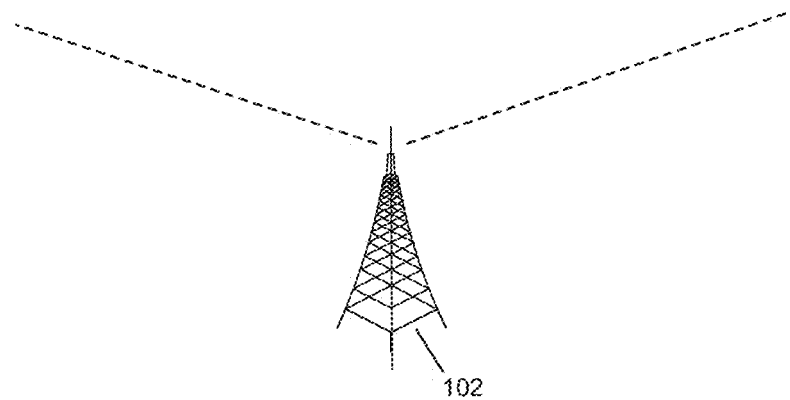

FIG. 4 is a block diagram showing various components of an example computing device 400 implementing a base station (e.g., the base station 102). The computing device 400 uses network information to prioritize between first and second classes of wireless traffic. The computing device 400 may be a general-purpose computer, such as a desktop computer, tablet computer, laptop computer, server that is capable of receiving inputs, processing the inputs, and generating output data. The computing device may also be a virtual computing device in the form of virtual machines or software containers that are hosted in a cloud.

The computing device 400 may be equipped with a communications interface 402, one or more processors 404, device hardware 406, and memory 408. The communications interface 402 may include wireless and/or wired communication components that enable the computing devices to transmit data to and receive data from other devices, whether through a dedicated wired connection or via a communications network. The device hardware 406 may include additional hardware that performs user interface, data display, data communication, data storage, and/or other server functions.

The memory 408 may be implemented using computer-readable medium, such as a computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processor(s) 404 and the memory 408 of the computing device 400 may implement an operating system 410, a core network interface 412, a wireless connection manager 414, a network information storage 416, a prioritizer 418, a validity bitfield storage 420, and a data buffer 422. The operating system 410 may include components that enable the computing device 400 to receive and transmit data via various interfaces (e.g., user controls, communications interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The core network interface 412 is a software component that exchanges user plane data and control plane data with components of the core network 104. The data plane data includes data to and from user devices such as the user devices 106 and 108. The control plane data may include network information such as instrumentation data, measurements, and statistics of the core network 104 that affects wireless traffic handled by the base station 102. The core network interface 412 stores the received network information in the network information storage 416.

The wireless connection manager 414 is a software component that receives data from and sends data to user devices through wireless communications. The wireless connection manager 414 includes software component(s) necessary to integrate CAT-M communication into LTE systems. The wireless connection manager 414 may exchange data with a user device through a radio access network of a cellular network. The wireless connection manager 414 may also collect information based on the wireless communications with the user devices, such as number packets or bits being exchanged with the user devices, the types of applications being run at the user devices, etc. The collected information is stored in the network information storage 416. The data being exchanged with the user device may include the content of the validity bitfield storage 420. The wireless connection manager 414 may use the content of the validity bitfield storage to determine whether to allow or disallow LTE-M traffic with user devices at a given subframe of a PRB. In some embodiments, when LTE-M traffic is disallowed from using a time-division or subframe, the wireless connection manager 414 may postpone the LTE-M traffic by storing LTE-M data temporarily in the data buffer 422 until the next available time-division or by requesting the user device to resend LTE-M data.

The prioritizer 418 retrieves network information from the network information storage 416 and generates a validity bitfield. The generated validity bitfield is stored in the validity bitfield storage 420. In some embodiments, the prioritizer 418 dynamically updates the content of the validity bitfield storage 420 based on the latest content of the network information storage 416. The prioritizer 418 may use the network information to generate metrics such PRB utilization, and to use the generated metric to determine how many subframes in a PRB to invalidate in order to deprioritize LTE-M traffic.

Figure 5:
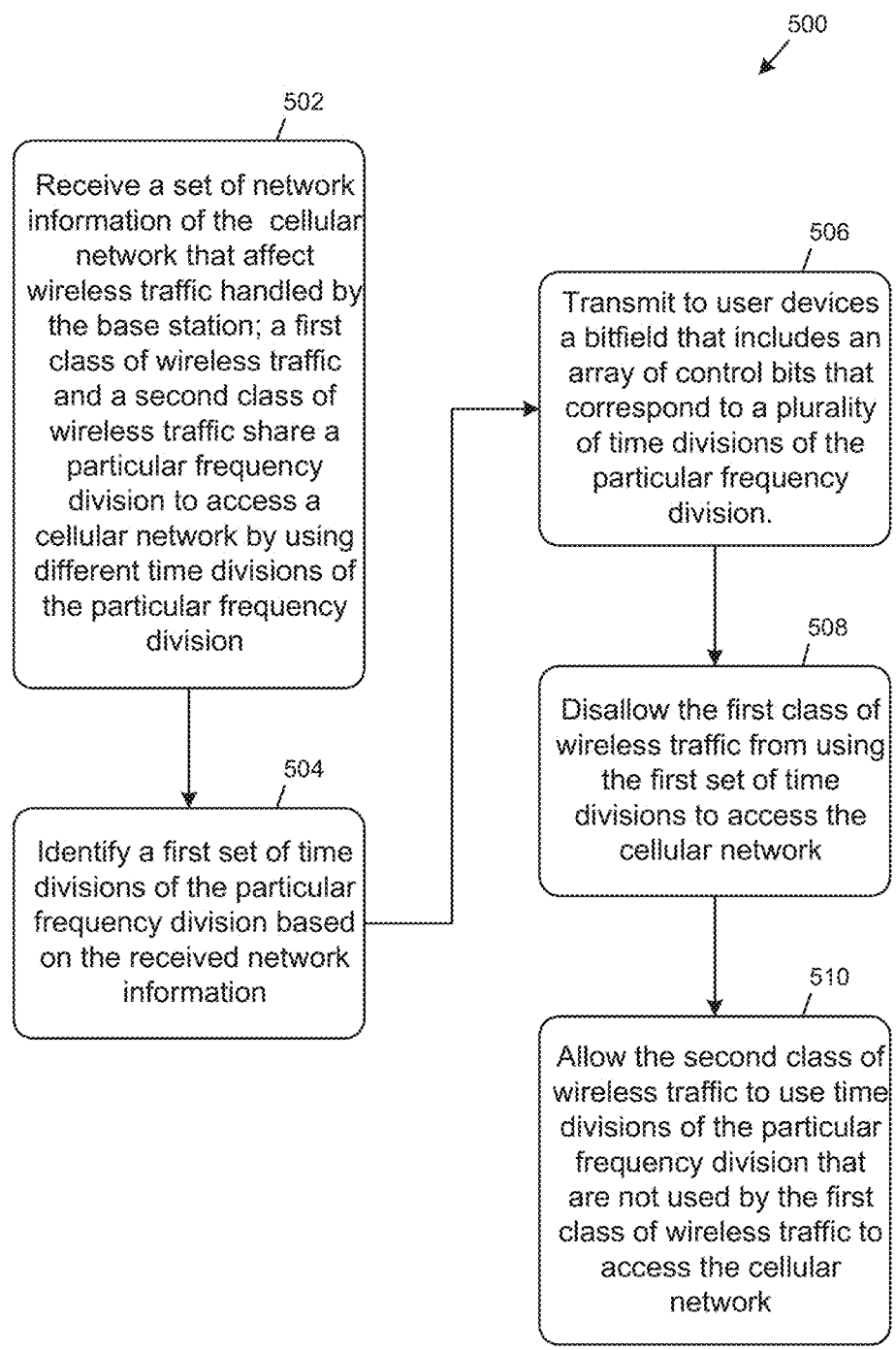
FIG. 5 conceptually illustrates a flow diagram of an example process for prioritizing between a first class of wireless traffic with a second class of wireless traffic based on a set of network information.

FIG. 5 conceptually illustrates a flow diagram of an example process 500 for prioritizing between a first class of wireless traffic with a second class of wireless traffic based on a set of network information. The first class of wireless traffic and the second class of wireless traffic share a particular frequency division (e.g., a PRB) to access a cellular network by using different time divisions of the particular frequency division. A base station of a cellular network performs the process 500 to process the network information and to designate time-divisions of frequency divisions (e.g., subframes of PRBs) as invalid for the first class of wireless traffic. In some embodiments, the first class of wireless traffic includes delay-tolerant LTE-M traffic, while the second class of wireless traffic includes delay-sensitive Wideband LTE or VoLTE traffic.

The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 502, the base station receives a set of network information of the cellular network that relates to the wireless traffic that the base station handles for user devices that are wirelessly connected to the base station. The network information may include service level agreement, network statistics, time, date, and historical traffic data. The network information may also include instrumentation data, measurements, and statistics collected by the base station from the cellular network and from the user devices wirelessly connected to the base station.

At block 504, the base station identifies a first set of time divisions of the particular frequency division based on the received network information. The base station may designate time-divisions of a frequency division as being not available for the first class of wireless traffic in order to guarantee that a lower bound number of time-divisions be available to the second class of wireless traffic. In some embodiments, the base station may use network information such as PRB utilization to determine how many time-divisions to designate as being unavailable to the first class of wireless traffic.

At block 506, the base station transmits to one or more user devices a validity bitfield including an array of control bits that correspond to a plurality of time divisions of the particular frequency division. The control bits at bit positions that correspond to the first set of time divisions are set to indicate that the first set of time divisions are invalid for transmitting the first class of wireless traffic. Each control bit in the bitfield is used by the user devices to determine whether a corresponding time division is valid or invalid for transporting the first class of wireless traffic.

At block 508, the base station disallows the first class of wireless traffic from using the first set of time divisions to access the cellular network. The base station may postpone requests to schedule transmission for the first class of wireless traffic (LTE-M) for time-divisions in the first set of time divisions.

At block 510, the base station allows the second class of wireless traffic to use time divisions of the particular frequency division that are not used by the first class of wireless traffic. A user device may use the validity bitfield to identify the time divisions that are invalidated for the first class of wireless traffic and therefore available to the second class of traffic. A user device may also use a time division that is not invalidated for the first class of wireless traffic to transport the second class of wireless traffic as long as the time division is not scheduled to transport the first class of wireless traffic.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors; and
a non-transitory computer-readable medium storing a plurality of computer-executable components that are executable by the one or more processors to perform a plurality of actions, the plurality of actions comprising:
receiving, at a base station, a set of network information of a cellular network that relates to wireless traffic handled by the base station, wherein a first class of the wireless traffic and a second class of the wireless traffic share a particular frequency division to access the cellular network by using different time divisions of the particular frequency division;
identifying, based on the received set of network information, a first set of time divisions of the particular frequency division;
disallowing the first class of the wireless traffic from using the first set of time divisions to access the cellular network, wherein a number of time divisions in the first set of time divisions is determined based on a lower bound for a number of time divisions allocated to the second class of traffic; and allowing the second class of the wireless traffic to use one or more time divisions of the particular frequency division that are not used by the first class of the wireless traffic to access the cellular network.

2. The computing device of claim 1, wherein the plurality of actions further comprise transmitting a plurality of control bits that correspond to a plurality of time divisions of the particular frequency division to a user device, wherein control bits at bit positions that correspond to the first set of time divisions are set to indicate that the first set of time divisions are invalid for transmitting the first class of the wireless traffic.

3. The computing device of claim 1, wherein the plurality of actions further comprises dynamically adjusting a number of time divisions in the first set of time divisions based on a utilization metric of the particular frequency division.

4. The computing device of claim 1, wherein the set of network information comprises utilization statistics of frequency divisions that are shared by the first class of the wireless traffic and the second class of the wireless traffic.

5. The computing device of claim 1, wherein the second class of the wireless traffic comprises delay-sensitive traffic and the first class of the wireless traffic comprises delay-tolerant traffic.

6. The computing device of claim 1, wherein the first class of the wireless traffic comprises data traffic from Internet of Things (IoT) devices and the second class of the wireless traffic comprises voice traffic.

7. A computer-implemented method, comprising:
receiving, at a base station, a set of network information of a cellular network that relates to wireless traffic handled by the base station, wherein a first class of the wireless traffic and a second class of the wireless traffic share a particular frequency division to access the cellular network by using different time divisions of the particular frequency division;
identifying, based on the received set of network information, a first set of time divisions of the particular frequency division;
disallowing the first class of the wireless traffic from using the first set of time divisions to access the cellular network, wherein a number of time divisions in the first set of time divisions is determined based on a lower bound for a number of time divisions allocated to the second class of traffic; and
allowing the second class of the wireless traffic to use time divisions of the particular frequency division that are not used by the first class of the wireless traffic to access the cellular network.

8. The computer-implemented method of claim 7, further comprising transmitting a plurality of control bits that correspond to a plurality of time divisions of the particular frequency division to user device, wherein control bits at bit positions that correspond to the first set of time divisions are set to indicate that the first set of time divisions are invalid for transmitting the first class of the wireless traffic.

9. The computer-implemented method of claim 7, further comprising dynamically adjusting a number of time divisions in the first set of time divisions based on a utilization metric of the particular frequency division.

10. The computer-implemented method of claim 7, wherein the set of network information comprises utilization statistics of frequency divisions that are shared by the first class of the wireless traffic and the second class of the wireless traffic.

11. The computer-implemented method of claim 7, wherein the second class of the wireless traffic comprises delay-sensitive traffic and the first class of the wireless traffic comprises delay-tolerant traffic.

12. The computing device of claim 7, wherein the first class of the wireless traffic comprises data traffic from Internet of Things (IoT) devices and the second class of the wireless traffic comprises voice traffic.

13. One or more non-transitory computer-readable media of a computing device storing computer-executable instructions that upon execution cause one or more processors to perform acts comprising:
receiving, at a base station, a set of network information of a cellular network that relates to wireless traffic handled by the base station, wherein a first class of the wireless traffic and a second class of the wireless traffic share a particular frequency division to access the cellular network by using different time divisions of the particular frequency division;
identifying, based on the received set of network information, a first set of time divisions of the particular frequency division;
disallowing the first class of the wireless traffic from using the first set of time divisions to access the cellular network, wherein a number of time divisions in the first set of time divisions is determined based on a lower bound for a number of time divisions allocated to the second class of traffic; and
allowing the second class of the wireless traffic to use time divisions of the particular frequency division that are not used by the first class of the wireless traffic to access the cellular network.

14. The one or more non-transitory computer-readable media of claim 13, wherein the one or more processors perform acts further comprising:
transmitting a plurality of control bits that correspond to a plurality of time divisions of the particular frequency division to a user device, wherein a user device receiving the control bits uses each control bit to determine whether to use a time division that corresponds to the control bit for transporting the first class of the wireless traffic.

15. The one or more non-transitory computer-readable media of claim 13, wherein the one or more processors perform acts further comprising:
dynamically adjusting a number of time divisions in the first set of time divisions based on a utilization metric of the particular frequency division.

16. The one or more non-transitory computer-readable media of claim 13, wherein the set of network information comprises utilization statistics of frequency divisions that are shared by the first class of the wireless traffic and the second class of the wireless traffic.

17. The one or more non-transitory computer-readable media of claim 13, wherein the second class of the wireless traffic comprises delay-sensitive traffic and the first class of the wireless traffic comprises delay-tolerant traffic.

* * * * *